455-296 SR CROSS REFERENCE SEARCH ROOM
FIP8106 XR 2,797,259

X 5432E

June 25, 1957 L. P. THOMAS 2,797,259

TELEVISION RECEIVER NOISE SUPPRESSION

Filed May 31, 1955

INVENTOR.
LUCIUS P. THOMAS
BY
ATTORNEY

2797259
OR IN 358/157

2,797,259

TELEVISION RECEIVER NOISE SUPPRESSION

Lucius P. Thomas, West Collingswood, N. J., assignor to Radio Corporation of America, a corporation of Delaware Application May 31, 1955, Serial No. 512,160

1 Claim. (Cl. 178—7.3)

The present invention relates to improvements in television receiving systems and more particularly to improved means for increasing the noise immunity of television receiving circuits.

One aspect of the present invention relates to an improved arrangement for interconnecting an automatic gain control circuit and synchronizing signal separator circuit in a television receiver whereby increased noise immunity is realized. Another aspect of the present invention relates to an improved means for interconnecting an automatic gain control circuit and synchronized signal separating circuit with a noise suicide circuit in a television circuit in a manner to increase the noise immunity of the television receiver.

A constant effort is made in the design of home television receivers to improve the performance of the receiver under conditions where the ratio of desired signal intensity to unwanted noise is low. The most vulnerable sections of a home type television receiver to noise disturbances are well-known to be the automatic gain control section and the synchronizing signal separator section. If either of these sections of a television receiver are sensitive to noise disturbances mis-synchronization of the receiver may result and severe degradation of picture quality follow.

In order to improve the noise sensitivity of television receivers, it has been popular to provide a noise inversion scheme sometimes referred to as a noise cancellation or noise suicide circuit. The noise suicide circuit depends upon applying to the input terminals of the automatic gain control circuit and/or the synchronizing signal separator circuit a noise signal which is in phase opposition to the noise otherwise appearing in the signals applied to these circuits. Cancellation of the noise may then take place and improved receiver operation realized. In the practical application of noise suicide circuits many problems arise owing to causes dictated by the requirement of maintaining circuit costs at a minimum in order to make home type television receivers available for mass public consumption.

It is, therefore, an object of the present invention to provide improved circuit arrangement for television receivers which will improve noise immunity.

It is another object of the present invention to provide an improved circuit arrangement for television receivers employing a noise suicide type circuit in conjunction with an automatic gain control circuit and synchronizing signal separator circuit, whereby improved noise immunity is realized at minimum cost.

In the practice of the present invention a synchronizing signal separator circuit is connected to receive input signals at a point in the television circuit which is direct current connected with the input terminal of an automatic gain control circuit. The unwanted noise charging action in the synchronizing signal separator circuit is made to counteract the unwanted noise charging action of the automatic gain control circuit, whereby the noise immunity of the automatic gain control circuit is effectively improved. Moreover, a noise suicide circuit is coupled to the input of the synchronizing signal separator circuit such that the amount of noise reaching the synchronizing signal separator circuit and the automatic gain control circuit is reduced while maintaining a time constant and frequency response balance between the noise suicide signal source and the source of video signal as viewed by the input terminal of the synchronizing signal separator tube. By virtue of this frequency response balance improved performance is obtained for signals of an amplitude below the operating threshold of the automatic gain control circuit or even in the absence of an automatic gain control circuit.

A better understanding of the present invention as well as a further appreciation of its objects and advantages may be obtained by reading of the following description, especially when taken in connection with the accompanying drawings in which.

Figures 1, 2:
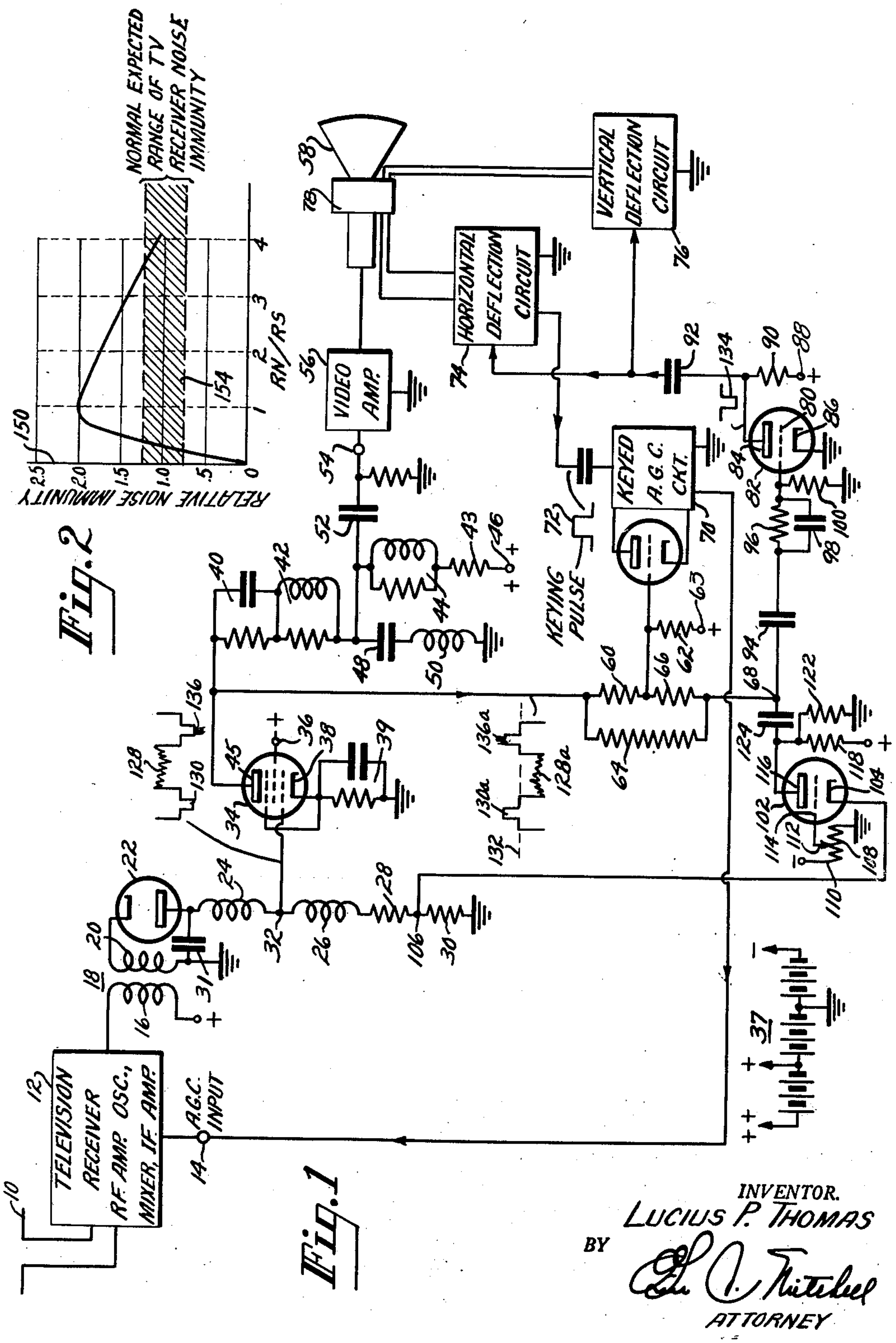
Fig. 1 is a combination block and schematic representation of an embodiment of the present invention as applied to one form of television receiver circuit arrangement.
Fig. 2 is a graphical presentation of certain operational advantages provided by and characterizing the present invention.

Turning now to the drawing, the antenna 10 comprises a source of television signals which is coupled to the conventional television receiver elements in block 12. Within block 12 have been indicated a radio frequency (R. F.) amplifier, an oscillator, a superheterodyne mixer and an intermediate frequency (I. F.) amplifier, all conventional elements of a standard superheterodyne television signal receiver. An automatic gain control potential input terminal 14 has been indicated for accepting a direct current automatic gain control potential which is applied within the block 12 to one or more amplifiers to control the gain of the overall television receiving system. The output signal from the I. F. amplifier in block 12 is applied across the primary winding 16 of the I. F. transformer 18 for coupling via the secondary winding 20 to the diode demodulator device 22. The lower extremity of the secondary winding is connected with circuit ground. A conventional diode demodulator load circuit comprising the inductor 24, inductor 26, resistor 28 and resistor 30 is shown connected from the anode of the diode 22 to circuit ground. A capacitor 31 is connected from the anode of the diode 22 directly to circuit ground.

The terminal 32 on the load circuit for the demodulator provides a source of demodulated television signals which is coupled to the control electrode of the video amplifier tube 34. A source of positive potential connected with the screen electrode of the tube 34 is indicated as having a terminal at 36 to establish a pentode operation for the video amplifier. By way of example a power source has been shown at 37 capable of providing the operating potentials for the circuit as herein described. The cathode 38 of the video amplifier tube 34 is connected through a conventional self-biasing circuit 39 to circuit ground. Conventional frequency selective signal peaking circuits 40, 42 and 44 are connected in series with one another between the anode 45 of the amplifier 34 and a source of positive potential having a terminal at 46. A series combination of capacitor 48 and inductor 50 is provided connected from the junction of elements 42 and 44 to circuit ground for attenuating the beat frequency signal produced between the video carrier and the sound carrier being received. The signal developed at the upper terminal of capacitor 48 represents amplified video signal and is capacitively coupled via capacitor 52 to the input terminal 54 of a conventional video output amplifier 56. Signal delivered by the video amplifier 56 is conventionally applied to the kinescope 58 for television picture reproducing purposes.

In accordance with the present invention another circuit branch is provided in the output circuit of the video amplifier 34. This branch comprises the resistor 60 and resistor 62 connected in series to a source of positive potential having a terminal indicated at 63. The potential available at terminal 64 is shown as less than that available at terminal 46 so that the majority of anode current flow to the video amplifier 34 will pass through the peaking elements 40, 42 and 44. In shunt with the resistor 60 is the series combination of resistor 64 and resistor 66, the junction between which is defined at terminal 68. Output signal developed at the upper terminal of resistor 62 is direct current (galvanically) connected to the input circuit of a keyed automatic gain control circuit 70 which may be of any conventional form. Keying pulses 72 for the automatic gain control circuit 70 are conventionally derived from the horizontal deflection circuit shown in block form as 74. Both the horizontal deflection circuit 74 and associated vertical deflection circuit 76 are operatively coupled to an electromagnetic deflection yoke 78 shown in block form surrounding the neck of the kinescope 58.

In further accordance with the present invention video signal developed at terminal 68 is capacitively coupled to the control electrode 80 of a synchronizing signal separator amplifier device 82 having operating electrodes 84 and 86 respectively designated as corresponding to a vacuum tube anode and cathode. The anode 84 is connected to a source of polarizing potential having terminal at 88 through a load resistor 90 across which is developed separated synchronizing (sync) pulses as described hereinafter. The separated sync pulses are capacitively coupled via capacitor 92 to the horizontal and vertical deflection circuits 74 and 76. The video signals applied to the control electrode 80 of the synchronizing signal separator amplifier device 82 from the video amplifier are coupled thereto via capacitor 94 and resistor 96. Capacitor 94 in combination with capacitor 98, resistor 96 and resistor 100 constitute a conventional time constant bias developing means for the signal separator tube to maintain the tube non-conducting except for signal amplitudes which exceed the well-known blanking level of the received television signals. The bias so developed results from well-known control electrode current conduction in the separator tube 82 attributable to the positive going excursions of the synchronizing pulses appearing at terminal 68 as hereinafter discussed more fully.

In further accordance with the present invention a noise suicide circuit is provided comprising a conventional noise amplifying and signal phase inverting amplifier device 102. The cathode 104 of the device 102 is connected to the point 106 in the television signal demodulator load circuit associated with the diode 22. Bias means comprising a potentiometer 108 connected between a negative potential source having a terminal at 110 and circuit ground and having a movable arm 112 galvanically connected with the control electrode 114 is adjusted to maintain the amplifier 102 in a condition of non-conduction except for signal excursions exceeding the peaks of the demodulated synchronizing pulses. Polarizing potential for the anode 116 of amplifier 102 is provided through a resistance means 118 connected with a positive potential source having a terminal at 120. Resistor 122 is connected between the anode 116 and circuit ground to form a voltage divider in combination with the resistor 118 and in effect constitutes a portion of the resistance means constituting the load circuit for the amplifier 102. A capacitor 124 is connected between the anode of the noise amplifier 102 and terminal 68 in the load circuit of the video amplifier 34.

The operation of the circuit shown in the drawing is substantially as follows:

Received television signal is demodulated by the diode 22 to provide a video signal 128 at the terminal 32 of the demodulator circuit. With the particular arrangement shown by way of example, the synchronizing pulse component 130 of the video signal extends in the negative going direction with respect to circuit ground. The amplified video signal appearing at the anode 45 of the video amplifier 34 will be such that the synchronizing pulse 130 of the waveform 128 will extend in a positive direction as shown by the waveform 128*a*. The output signal 128*a* is capacitively coupled to the sync separator tube 82 which will produce periodic loading on the output load circuit of the video amplifier through the series resistors 60, 66 (and 64 connected in shunt therewith) owing to control electrode conduction in the tube 82. The time constant network connected with the control electrode 80, described above, will develop a negative potential on the control electrode as a result of control electrode current flow. By properly valuing the time constant parameters connected with the control electrode 80 an operating bias will be established on the control electrode 80 which will permit conduction in the sync separator tube only for signal excursions exceeding the amplitude of the television signal blanking level 132 indicated in connection with waveform 128*a*. Separated synchronizing pulses 134 will therefore appear across the load resistor 90 connected in the anode circuit of tube 82. By virtue of the control electrode conduction, not only will the potential of the control electrode 80 be established at some negative value with respect to circuit ground but during conduction of the control electrode the junction between resistors 60 and 66 will be established at a more negative potential with respect to circuit ground than if the control electrode 80 were not coupled to this junction.

Let it be assumed that during the signal reception a noise burst 136 occurs during a synchronizing pulse interval as shown in connection with waveforms 128 and 128*a*. Conduction current in the control electrode 80 of the sync separator tube 82 will increase and the negative bias on the control electrode 80 will tend to increase. However, the keyed AGC circuit 70 will sense the noise burst 136 as an increase in signal strength and immediately develop a more negative automatic gain control potential which when applied to the AGC terminal 14 will reduce the gain of the receiver. The conventional time constant circuit included in the AGC circuit will tend to prolong the effect of the noise burst by permitting the noise burst to effectively charge up or "set-up" the AGC circuit output control potential for a period of time longer than a single synchronizing pulse or horizontal line period.

In accordance with the present invention the circuit values in the output circuit of the video amplifier 34 including resistors 60, 62, 64, 66, 96, 100, etc., and capacitors 94 and 98 are so valued that the negative potential to which the grid of the AGC tube is swung is less by an amount which will counteract the direct "set-up" of the AGC circuit by the noise. Hence, the time constant network connected with the sync signal separator tube 82 provides corrective "set-down" for the AGC circuit.

In further accordance with the present invention, the noise excursions reaching the synchronizing signal separator tube as well as the keyed AGC circuit are reduced through the action of the noise amplifier 102. The noise amplifier 102, as described above, includes threshold biasing means 108 and 112 operative to render the noise amplifier conductive only for signals whose amplitude exceeds the peak amplitude of the synchronizing pulse component 130. Thus, the noise excursions 136 will cause the cathode 104 of the triode 102 to swing sufficiently negative with respect to the control electrode 114 to establish conduction in the amplifier 102. In this way only noise excursions will be developed across the noise amplifier output load resistors 118 and 122. The values of the circuit parameters shown are such that the amplitude of noise signal delivered to terminal 68 is equal to or greater than the noise excursions appearing at terminal 68 delivered by the video amplifier 34. In accordance with the present invention, the frequency response of the circuit looked at from the control electrode 80 of the sync separator tube 82 both to the anode of the noise amplifier 102 and to the anode of the video amplifier 34 is made substantially the same over the wide range of signal frequencies occupied by noise signals. In this way, since the frequency components of the noise delivered by the noise amplifier are the same as the frequency components delivered by the video amplifier complete cancellation of noise will occur at the sync separator tube control electrode 80. Moreover, low frequency variations in the amplitude of received noise will not result in a change in the average D. C. potential appearing at the control electrode 80 of the sync separator. Another way of defining this advantageous arrangement is that the time constant looking from the control electrode 80 of the sync separator into the capacitor 124 is substantially the same as the time constant looking from the anode 116 into the capacitor 124. In practice it is found that exceptionally good noise immunity is obtained if the ratio of the alternating current resistance to circuit ground on the noise amplifier side (left hand terminal) of capacitor 124 is not more than three times or less than .5 times the values of the alternating current resistance to circuit ground from the sync separator side (right hand terminal) of capacitor 124. Under these conditions changes in the average intensity of signal noise will not produce appreciable low frequency shifting of the bias appearing on the control electrode of the sync separator tube 82. As a consequence the clipping or separating level of the sync separator tube 82 will be rendered substantially free of these low frequency variations. Some of the advantages offered by the present invention are shown by the graph of Fig. 2. Here relative noise immunity in a television is displayed along the ordinate 150 for various ratios along abscissa 152 of alternating current resistance to ground appearing on opposite sides of the noise signal coupling capacitor 124 of Fig. 1. For convenience in presenting the data of Fig. 2 the value of alternating current resistance between circuit ground and that terminal of the noise signal coupling capacitor (124 of Fig. 1) most directly connected with the noise amplifier 102 has been represented as $R_n$. On the other hand, the resistance to ground from that terminal of capacitor 124 most directly connected with the sync separator tube 82 has been represented as $R_s$. The abscissa 152, therefore, present values of the ratio $R_n/R_s$. It can be seen that for ratios $R_n/R_s$ more than .5 and less than 3 the noise immunity of a television receiver utilizing the present invention is above the normal range of noise immunity values usually expected of television receivers. Shaded area 154 shows this normal range.

It may be further noted that the advantageous arrangement of the present invention provides a degree of isolation between the sync separator tube 82 and the keyed AGC system 70. Resistor 66, for example, tends to reduce the amount of loading imposed on the keyed AGC circuit by periodic conduction of the sync separator tube 82. Thus, control electrode conduction by tube 82 will not tend to compress the amplitude of synchronizing signal applied to the keyed AGC circuit 70 while the resistor 66 further forms a part of the aforementioned noise "set-down" means which by virtue of the direct current or galvanic connection of the keyed AGC circuit to the video amplifier enhances AGC noise immunity.

Purely by way of example, outstanding noise immunity in a television receiving circuit has been obtained with the arrangement of the present invention shown in the drawing when the following circuit values are employed, for those circuit elements which are of most importance in achieving operation in accordance with the present invention as described above. The prefixes R and C will be employed to designate resistors and capacitors respectively.

| | |
|---|---|
| Tube **34** | 6AW8. |
| Tube **102** | 6AW8. |
| Tube **82** | 6U8. |
| R43 | 2,700 ohms. |
| R60 | 47,000 ohms. |
| R62 | 56,000 ohms. |
| R64 | 22,000 ohms. |
| R66 | 82,000 ohms. |
| R122 | 100,000 ohms. |
| R100 | 3.9 megohms. |
| R118 | 33,000 ohms. |
| R90 | 1 megohm. |
| C52 | .1 μfd. |
| C94 | .001 μfd. |
| C124 | .22 μfd. |
| C98 | 330 μμf. |
| R40—C40 | 10,000 ohms–39 μμf. |
| R42—L42 | 6,800 ohms–250 μh. |
| R44—L44 | 6,800 ohms–120 μh. |

Having thus described my invention what is claimed is:

In a television receiving system, the combination of: a circuit ground means acting as a signal reference for the elements of said system as hereinafter defined; a source of demodulated television signals having a direct current information component and whose peak intelligence excursions define a synchronizing pulse component which is exceeded in amplitude only by spurious noise signals; a direct current video amplifier means direct current coupled with said signal source for amplifying said demodulated signals so as to develop an output signal having a synchronizing pulse component extending in a positive polarity direction with respect to said circuit ground, said amplifier including a video amplifier device having an output electrode operatively connected through a galvanically conducting resistance load means to a source of ground referenced output electrode polarizing potential, said load means including a polarity of resistors connected to form a first and a second output terminals for delivering amplified video signals but isolated from one another by a galvanic path of substantial resistance such that a given degree of loading imposed on said first terminal does not impose as great a degree of loading on said second terminal; a synchronizing signal separator circuit including an amplifier device having operating electrodes corresponding to a control electrode, cathode and anode, said device being characterized by conduction between said control electrode and cathode whenever the potential of said control electrode exceeds the potential of said cathode by a given amount, said cathode being galvanically connected with said circuit ground means and said anode being connected with an output load circuit including an output resistor operatively connected with a ground referenced source of anode polarizing potential for delivering output signal in response to the flow of current from said anode electrode; a resistor connected between said separator amplifier device control electrode and circuit ground; an automatic gain control circuit operatively connected in said receiving system responsive to the amplitude of the synchronizing pulse component of demodulated television signals to control the gain of said receiving system, said gain control circuit having an input terminal and also including a time constant means tending to produce an undesired prolonged increase in gain control action in response to bursts of signal noise; a galvanic connection from said video amplifier first output terminal to said gain control circuit input terminal for supplying amplified video signals to said gain control circuit signal input terminal; a first means coupling said video amplifier second output terminal to said amplifier device control electrode for supplying amplified video signal thereto with said synchronizing pulse component in said positive polarity; a noise inverter amplifier means having an input circuit operatively coupled with said source of demodulated television signals to develop at the output circuit of said noise inverter amplifier means amplified signals having an electrical sense opposite to that of said signals appearing at said video amplifier second output terminal; threshold biasing means operatively included in said noise inverter amplifier means adjusted to restrict output signals from said noise inverter amplifier means to only those noise excursions exceeding in amplitude the peaks of said synchronizing pulses; a capacitor connected between the output of said noise inverter amplifier means and the control electrode of said synchronizing signal separator circuit amplifier device, the amplitude of signal delivered by said noise inverter amplifier means and the value of said capacitor being such to provide noise cancellation at said control electrode; and resistance means in said noise inverter amplifier means of a value establishing the following relationship: $R_n/R_s$ is greater than .5 but less than 3 where $R_n$ is the alternating current resistance to circuit ground from the noise inverter amplifier side of said capacitor and $R_s$ is the alternating current resistance to circuit ground from the synchronizing signal separator side of said capacitor.

References Cited in the file of this patent

UNITED STATES PATENTS 2,718,552 Anderson -------------- Sept. 20, 1955

OTHER REFERENCES

Rider's Television Manual, vol. 13; copyrighted September 27, 1954; Magnavox TV, pages 13–9 and 13–21; Philco TV, pages 13–11.